Aug. 21, 1923.   1,465,778
C. J. COLEMAN
MEANS FOR LUBRICATING LEAF SPRINGS
Original Filed Jan. 26, 1921
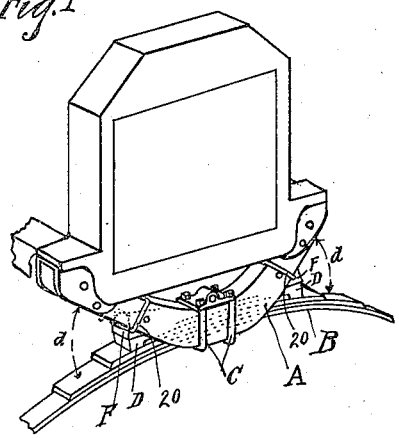
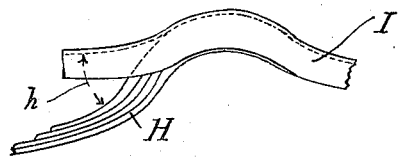
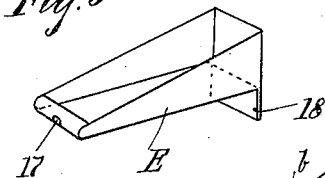
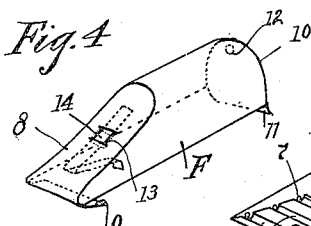
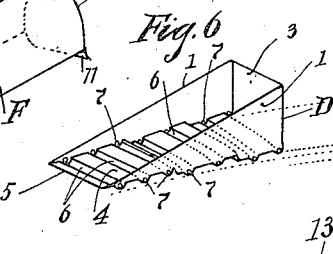
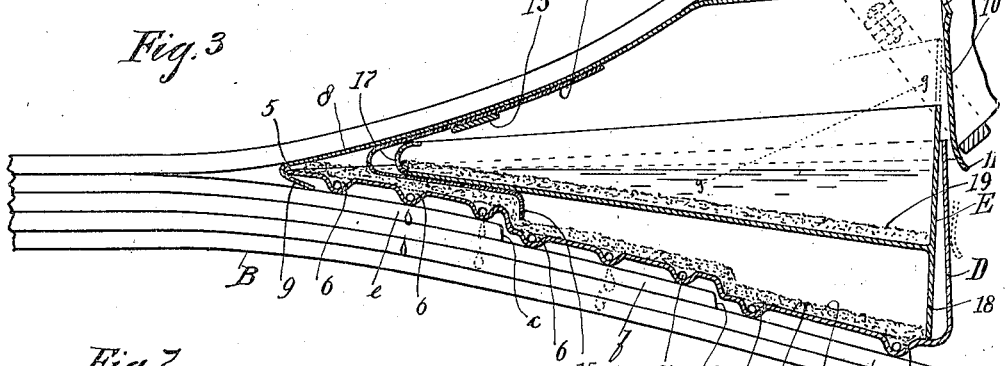
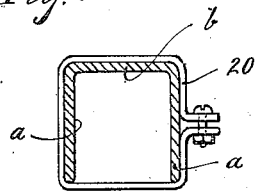
Inventor,
Carl J. Coleman
by H. S. Johnson
his Attorney.

Patented Aug. 21, 1923.

1,465,778

UNITED STATES PATENT OFFICE.

CARL J. COLEMAN, OF MINNEAPOLIS, MINNESOTA.

MEANS FOR LUBRICATING LEAF SPRINGS.

Application filed January 26, 1921, Serial No. 440,033. Renewed January 11, 1923.

*To all whom it may concern:*

Be it known that I, CARL J. COLEMAN, a citizen of the United States, residing at Minneapolis, in the county of Hennepin and State of Minnesota, have invented certain new and useful Improvements in Means for Lubricating Leaf Springs, of which the following is a specification.

This invention relates to means for lubricating leaf springs of automobiles, and more particularly, to means for lubricating the forward semi-elliptic cross spring, and the centrally arched rear cross spring of Ford cars.

An object of the invention, is the provision of an effective lubricant holding and dispensing device, which may be applied to Ford cars in such a manner, as to be almost wholly concealed from view, so as not to interfere with the general outward appearance of the car.

A further object of the invention, is to provide improved lubricating means for automobile leaf springs, wherein, during travel, the constant vibrations of the spring toward and away from the car body are utilized to assist in forcing the lubricant out of its holder.

A still further object of the invention, is to provide a device of the class described, which may be easily applied to the car and be conveniently accessible to replenish the oil supply in its reservoir.

To this end, the invention consists in the construction, combination and arrangement of parts, hereinafter described and claimed.

In the accompanying drawings:

Figure 1, is a fragmentary perspective view of the semi-elliptic cross spring of a Ford automobile, and the front cross member of the chassis frame supporting said spring, my invention being shown positioned thereon.

Figure 2 is a fragmentary rear view of the rear cross member of a Ford car, showing a part of the arched rear spring supported by said member, and my invention positioned thereon.

Figure 3 is an enlarged longitudinal sectional view of the invention, shown positioned between the forward cross member and spring.

Figures 4 and 5 and 6 are perspective views, drawn to a reduced scale, respectively of the cover, reservoir and distributor members of the invention, and Figure 7 is a front view of the fastening strap shown applied to the front cross member.

A designates the front cross member of the chassis frame of a Ford automobile, and B the semi-elliptic spring firmly secured, by means of the spring clip C, to said member. The cross member is channeled or U shaped in cross section, (Fig. 7) the legs a—a thereof extending downwardly in parallel relation, from the cross web b. Centrally, lengthwise, the cross member is formed with a straight portion, as are also the leaves of the spring B, so that the spring and cross member may be firmly bound together by the spring clip C. On either side of said clip, the cross member extends upwardly and outwardly in a long sweeping curve, while the spring curves downwardly and outwardly, thus forming a space (having curved diverging walls) between the under side of the cross web b and upper side of the spring leaves. As the spring leaves are made progressively shorter, shoulders c are formed on the upper side of the spring. Obviously, when the cross member is rocked laterally or the spring B stressed, the angle (as at d—d) between said diverging walls is changed with each movement. I have taken advantage of this constant change of angle, my invention being formed to yieldingly fit into said angle, between the legs a—a of the cross member. As the legs are comparatively deep, the invention is almost wholly concealed from view but conveniently accessible from its outer end.

The invention comprises a casing consisting of a distributing element D, a supply holding element E, and a cover member F.

The distributing element comprises a wedge shaped receptacle with parallel side walls 1, and an end wall 3, and an inclined bottom 4. The walls 1—1 and 3 form a rectangular opening, of which the edge 5 of the bottom 4 forms one end. The bottom is formed with successive offsets, so as to fit over the upper sides of the overlapping members e—f and g of the leaf spring as shown in Figure 3. At intervals throughout its length, the bottom 4 is formed with transverse gutters 6, extending to the side walls 1, each gutter having at its opposite ends an oil outlet 7 cutting through the walls 1. The element D is formed, so as to render its open top approximately level, when the spring B is under normal stress. Telescoping closely over the element D, like the cover of a paper box, is the cover F, its forward portion formed with a rearwardly inclined wall 8, and a rearwardly opening hook 9 at the base of said wall, said hook extending the full width of the cover, and adapted to receive the edge 5 of the element D. The outer wall 10 of the cover is formed at its base with a lip 11, and at its top with an oil hole 12, through which oil may be supplied. The wall 8 is slightly curved to fit the curvature of the cross member A, and is indented or offset inwardly to form a slide support 13 for the strap spring 14, said spring being bent, forward of its support, to extend rearwardly in spaced and parallel relation with the bottom 4 of the element D. At its rear extremity it is bent downwardly to form a stub 15, extending over one of the offsets in the bottom 4 to hold the spring against shifting. Between the spring 14 and the bottom 4, and entirely covering the latter, is a wick 16, whereby oil is carried from one gutter 6 to the other. Nesting into the element D so as to be readily removable, is the wedge shaped oil reservoir E, having at its shallow forward end an oil outlet 17, and at its opposite end a support 18 adapted to rest on the bottom 4 of the element D. When positioned the top of the reservoir is approximately level when the spring B is under normal stress. A wick 19 covering the bottom of the reservoir serves to conduct the oil to the outlet 17. Forward, the reservoir rests on the wick 16, so that oil discharged from the outlet 17 is distributed by the said wick. To compensate for the steeper angle at $h$ with respect to the rear spring H, supported by the rear cross member I, the reservoir is made deeper, as indicated in dotted lines (Fig. 3) so that the level of the oil would be indicated by the line $g$—$g$. To hold the device positioned, I provide the strap clip 20, which latter may be firmly secured to the cross member so as to engage the lip 11 of the cover, thereby preventing the device from slipping out of place.

As the angle between the cross member and spring B changes, the element D will pivot with its edge 5 in the hook 9, the spring 14 constantly tending, under stress, to separate said cross member and spring B. Thus, the cover in its incessant up and down movement, during travel, operates like a bellows; it sucking air through its telescoping joint with the element D, with every up stroke, and tending to force the oil out of the openings 7 with every down stroke.

As the oil oozes out of the openings 7 it runs down the edges of the spring leaves and works its way into the crevices between them.

I claim:

1. An oiling device of the class described, comprising in combination with a vehicle frame and a leaf spring connected with said frame, a part of said spring extending at an angle from said frame, said angle changing responsive to the flexing of said spring, a closed oil container held positioned in said angle, having oil discharge openings adjacent said spring, said container comprising an upper part and a lower part fitted to be movable in approximately air tight relation toward and away from each other, and means constantly holding said upper part against said frame and said lower part against said spring.

2. An oiling device, of the class described, comprising in combination with a vehicle frame and a leaf spring secured to said frame, a part of said leaf spring extending at an angle from said frame so that said angle will change responsive to the flexing of said spring, a lubricant container held positioned in said angle on the top of the leaves of the spring and having discharge openings adjacent the edges thereof, and a cover for said container, mounted so as to yield vertically responsive to the flexing of said spring.

3. An oiling device of the class described, comprising in combination with a channeled frame member, the channel thereof directed downwardly, and a leaf spring mounted in the channel of said member and extending at an angle out of said channel, a lubricant holding dispensing device having discharge openings adjacent said spring and formed to fit the angle between the channel and said spring and means on the channel for holding said device positioned.

4. An oiling device of the class described comprising a closed casing formed of telescoping sections one above the other and constructed to fit into the angle formed at the juncture of the frame of a vehicle with a downwardly and outwardly curved leaf spring, said angle changing responsive to a flexing movement of said spring, means tending to separate said telescoping sections, the lower section of said casing fitting over the upper curved surface of the leaves of said spring and having discharge openings along its lower outer edges, the edge surrounding the top of said lower section being normally in a level plane.

5. An oiling device of the class described and for the purpose set forth, comprising an open top receptacle having an inclined floor formed with transverse gutters and outlet openings at the ends of each of said gutters cutting through the walls of said receptacle, a cover pivoted on one end of said receptacle and telescoping over the sides thereof, means for constantly tending to separate said receptacle and cover, and a supply reservoir removably fitting into said receptacle and extending to the high end of the floor thereof and having a discharge opening thereat.

6. An oiling device of the class described and for the purpose set forth, comprising a casing formed of a lower member having a laterally grooved inclined bottom and discharge openings at the grooves along the edges of said bottom, a spring pressed cover member fitting over said lower member so as to be movable downwardly against the stress of its spring, an oil supplying means within the casing for supplying oil at the elevated end of said inclined floor, and an element capable of holding the oil by capillary action covering said inclined bottom to slowly convey the oil down the inclined bottom to said grooves.

In testimony whereof I affix my signature.

CARL J. COLEMAN.